United States Patent [19]

Thiery et al.

US005188791A

[11] Patent Number: 5,188,791
[45] Date of Patent: Feb. 23, 1993

[54] CONCRETE COMPOSITION FOR THE MANUFACTURE OF MOULDS, MOULD AND PROCESS FOR THE MANUFACTURE OF A MOULD

[75] Inventors: Jacques Thiery, Essey lès Nancy; Jacques Schoennahl, Villeurbanne, both of France

[73] Assignee: Savoie Refractaires, France

[21] Appl. No.: 677,932

[22] Filed: Apr. 1, 1991

[30] Foreign Application Priority Data

Apr. 2, 1990 [FR] France ................. 90 04193

[51] Int. Cl.$^5$ ............. B29C 33/40; B22C 15/20; B28B 7/36; C04B 14/48
[52] U.S. Cl. ................. 264/226; 264/234; 264/333; 264/225; 164/6; 164/15; 164/21; 106/38.2; 106/38.27; 106/38.3; 106/38.9; 106/624; 106/632; 106/634; 106/636
[58] Field of Search ........... 106/38.2, 38.22, 38.27, 106/38.3, 38.6, 640, 643, 692, 695, 711, 713, , 38.9, 608, 612, 623, 624, 632, 634, 636; 425/406, 407, 423, 509, DIG.-38; 264/219, 234, 333, 225, 226; 164/6, 15, 21

[56] References Cited

U.S. PATENT DOCUMENTS

3,229,338 3/1965 Kopera .................... 22/193
4,780,141 10/1988 Double et al. .......... 106/38.3
4,915,740 4/1990 Sakai et al. ............. 106/104

FOREIGN PATENT DOCUMENTS

380006 3/1986 Austria .
0273181 7/1988 European Pat. Off. .
2387924 11/1978 France .
2640962 6/1990 France .
WO8600612 1/1986 PCT Int'l Appl. .

Primary Examiner—William R. Dixon, Jr.
Assistant Examiner—Michael A. Marcheschi
Attorney, Agent, or Firm—Sughrue, Mion, Zinn, Macpeak & Seas

[57] ABSTRACT

Compound concrete composition for the manufacture of moulds, comprising: (1) a binder which comprises an alkaline-earth mineral substance, a constituent made up of fine particles of a compound other than an oxide, 90% of which have a particle size of between 1 and 150 μm with a median diameter of between 3 and 20 μm, these fine particles comprising particles of a substance which has a thermal conductivity higher than approximately 30 W/mK, chosen from silicon carbides, silicon carbonitrides, silicon nitrides, boron carbides, titanium carbides and tungsten carbides and a constituent made up of ultrafine particles at least 70% of which have a particle size smaller than 1 μm with a median diameter of between 0.3 and 0.8 μm, (2) water optionally with the addition of a dispersant, and (3) fillers comprising metal granulates and metal fibres, wherein the water/binder ratio is lower than 0.20 and the concrete composition has a thermal conductivity at 200° C. which is equal to or higher than 5 W/m K.

11 Claims, No Drawings

CONCRETE COMPOSITION FOR THE MANUFACTURE OF MOULDS, MOULD AND PROCESS FOR THE MANUFACTURE OF A MOULD

BACKGROUND OF THE INVENTION

The present invention relates to a compound concrete composition for the manufacture of moulds intended in particular for moulding articles made of plastic.

Metallised concrete moulds have been proposed to make articles made of plastic more economical to mould, in particular those of large size, such as body components for motor vehicles.

The compound concretes which form part of the constitution of these moulds must combine different properties. Firstly, they must ensure good thermal conductivity, since these moulds are heated and/or cooled during the moulding operation.

Secondly, they must have mechanical properties which ensure good ductility and a satisfactory flexural strength, since the moulds are subjected to a considerable mechanical stress when they are being employed.

Finally, they must have a suitable expansion coefficient which is compatible with that of the metal coating of the mould and possibly with that of metal components which are needed for the moulding and at least a part of which is embedded in the concrete.

SUMMARY OF THE INVENTION

The objective of the present invention is to propose a composition exhibiting the properties referred to above to a high degree and therefore being particularly suitable for the manufacture of metallised concrete moulds.

The subject of the present invention is thus a compound concrete composition for the manufacture of moulds, characterised in that it comprises: (1) a binder which comprises an alkaline-earth mineral substance chosen from calcium aluminate or calcium silicoaluminate metallurgical slags, aluminous cements of the calcium monoaluminate and calcium dialuminate types, silicoaluminous cements, calcium or barium silicates and alkaline-earth metal oxides which have been calcined at a very high temperature beforehand, of the magnesia, dolomite, lime and barytes group, a constituent made up of fine particles of a compound other than an oxide, 90% of which have a particle size of between 1 and 150 $\mu$m with a median diameter of between 3 and 20 $\mu$m, these fine particles comprising particles of a substance which has a thermal conductivity higher than approximately 30 W/mK chosen from silicon carbides, silicon carbonitrides, silicon nitrides, boron carbides, titanium carbides and tungsten carbides, and a constituent made up of ultrafine particles at least 70% of which have a particle size smaller than 1 $\mu$m with a median diameter of between 0.3 and 0.8 $\mu$m, (2) water optionally with the addition of a dispersant, and (3) fillers comprising metal granulates and metal fibres, the water/binder ratio being lower than 0.20, the concrete composition having a thermal conductivity at 200° C. which is equal to or higher than 5 W/m K.

The thermal conductivity of 30 W/m K of the fine particles is markedly superior to that of the fine particles present in the cements which are usually employed.

In addition, the fine particles advantageously have a high hardness, preferably of at least 1800 kg/mm$^2$ Knoop hardness.

The metal granulates are preferably chosen from shot made of steel, stainless steel, cast iron, copper and any metal or alloy which is chemically compatible with the binder.

The metal fibres are advantageously steel or stainless steel fibres.

Another subject of the invention is a mould comprising two half-moulds made of metallised concrete, intended in particular for moulding articles, preferably of large size, made of plastic, comprising a compound concrete composition such as defined above.

Another subject of the invention is a process for the manufacture of a mould consisting of two half-moulds according to the invention, comprising the following stages:

production of master models of the half-moulds, using a resin, metallisation of the master models, casting a concrete according to the invention, followed by a heat treatment.

DESCRIPTION OF THE PREFERRED EMBODIMENTS

Once the casting of the concrete has taken place, the concrete is advantageously allowed to set at a temperature of 20° C. for a period of 16 to 24 hours, it is stoved in an oven at a temperature ranging from room temperature to approximately 60° C., the temperature is raised to approximately 250° C. at a rate ranging from 1° to 20° C./h, it is left at this temperature for a period of 6 to 18 h, it is cooled to a temperature of 70° to 80° C. at a rate of 1° to 20° C./h and is removed from the oven at this temperature.

The period of 6 to 8 hours is determined as a function of the mass of the article to be treated.

The mineral substance of which the binder (1) consists is advantageously an aluminous cement.

The best performance has been obtained with a Secar 71 cement. It is preferably added in a proportion which varies between 10 to 30% by weight of the binder.

90% of the fine particles have a particle size of between 1 and 150 $\mu$m with a median diameter of between 3 and 20 $\mu$m.

They are added in a proportion which varies preferably between 14 and 54% by weight of the binder.

At least 70% of the ultrafine particles have a particle size smaller than 1 $\mu$m with a median diameter of between 0.3 and 0.8 $\mu$m. They are chosen from microsilica, chromium oxide, titanium oxide, zirconium oxide and aluminium oxide.

Microsilica is preferred in particular, especially the thermal microsilica obtained by reduction of zirconium silicate, which has a low specific surface and absorbs little water.

The ultrafine particles are added in a proportion which varies preferably between 14 and 54% by weight of the binder.

Water is added in a quantity such that the water/binder ratio is lower than 0.20, preferably lower than 0.16, by weight.

The quantity which is added is as small as possible, to limit the porosity of the concrete, insofar as the thermal conductivity of the concrete must be high.

A dispersant is optionally added, advantageously chosen from alkali metal hexametaphosphates, tripolyphosphates and polynaphthalenesulphonates. In this respect, preference will be given to sodium hexametaphosphate or sodium tripolyphosphate.

The metal fibres are advantageously made of steel or stainless steel.

Their diameter is preferably between 80 μm and 150 μm and their length between 2 mm and 5 mm.

The steel composition range is as follows:

|  | C(%) | Mn(%) | Si | P | S | Cr | Mo |
|---|---|---|---|---|---|---|---|
| steel | 0.05–0.012 | 0.7–1 | 0.015–0.020 | 0.01–0.04 | — | — | — |
| stain. steel | ≦0.07 | ≦1 | ≦1 | ≦0.045 | ≦0.03 | 16–18 | 0.9–1.2 |

They are added in a proportion of 200 to 300 parts by weight, preferably 110 to 250, per 100 parts by weight of alkaline-earth mineral substance.

The metal granulates are advantageously round or angular shot made of steel, stainless steel, cast iron, copper or any metal or alloy which is chemically compatible with the binder, or consists of a mixture of these components, with copper making it possible to increase the thermal conductivity of the final concrete, and cast iron being preferred for cost reasons and for its mechanical properties.

The metal granulates have a particle size of between 90 μm and 850 μm and are preferably chosen from one or more of the following ranges:

first range: particle size of between 90 and 425 μm, 70% of the shot being between 180 and 355 μm;

second range: particle size of between 125 and 600 μm, 70% of the shot being between 300 and 500 μm;

third range: particle size of between 90 and 425 μm, 65% of the shot being between 180 and 425 μm.

The cast iron shot is chosen especially from haematite shot with a hardness of 50–70 Rc, in which the principal phase is cementite and the C, P and S composition is 3%, 0.1% and 0.1% respectively, and "super rapid" cast iron shot of hardness 65–67 Rc, in which the principal phase is cementite and the C, P and S composition is 3%, 0.1% and 0.1% respectively.

Among the steel shots preference is given to the shots marketed by the Wheelabrator-Allevard company.

The metal granulates are added in a proportion of 600 to 800 parts, preferably 660 to 780 parts per 100 parts by weight of alkaline-earth mineral substance.

The finished concrete has the following properties after heat treatment at 250° C., as described above:

compressive breaking stress $\sigma c$ higher than or equal to 160 MPa flexural breaking stress $\sigma f$ LOP proportionally limit or elasticity limit higher than or equal to 25 MPa MOR breaking stress higher than or equal to 30 MPa deformation at break: ξ higher than or equal to 0.15% porosity lower than or equal to 20%, preferably to 16% thermal conductivity at 200° C.: higher than or equal to 5.0 W/m K.

Examples of formulation of the concrete according to the invention will be given below.

EXAMPLE 1

|  | % by weight | parts by weight |
|---|---|---|
| S.S. shot (0.105 to 0.210 mm) | 48.7 | 696 |
| Steel fibres (3 mm - φ 0.150 mm) | 16.3 | 232 |
| Reground SiC (1 to 150 μm) | 17.5 | 250 |
| Microsilica (0.01 to 4 μm; median diameter 0.7 μm; particle size: 90% ≦ 4 μm and 10% < 0.2 μm) | 10.5 | 150 |
| Secar 71 cement | 7 | 100 |
| Na tripolyphosphate | +0.25 | 3.6 |
| Water (%) |  | 75 |

The concrete is vibro-cast and then left open to the air for 24 hours to ensure its hydraulic setting before the heat treatment.

EXAMPLE 2

A concrete formulation was prepared separately by again taking the same constituents as in Example 1, except that the stainless steel shot was replaced with 696 parts of S70 cast iron shot (90 to 425 μm particle size), the water being added in a proportion of 68.6 parts per 100 parts of Secar 71 cement.

The properties of the concretes of Examples 1 and 2 are summarised in the table below:

They have been measured on test pieces 4×4×16 cm (*) and 200×80×10 mm (**) in size.

|  |  | Ex. 1 | Ex. 2 |
|---|---|---|---|
| * | Relative density | 3.90 | 3.63 |
| * | AFNOR porosity (%) | 16 | 10.7 |
| * | σc (MPa) | 196 | 209 |
| ** | M O R (MPa) } flexural measurements | 41 | 45 |
| ** | LOP (MPa) | 33.5 | 37 |
| ** | ξ (%) | 0.23 | 0.28 |
| * | Thermal conductivity W/m K | 5.00 | 6.20 |

All the parameters were measured after stoving at +240° C. to 250° C.

What is claimed is:

1. Process for the manufacture of a mould consisting of two half-moulds made of metallized concrete, comprising the following stages:

production of master models of the said half-moulds, using a resin metallisation of the said master models casting a concrete composition comprising (1) a binder which comprises from 10 to 30% of an alkaline-earth mineral substance selected from the group consisting of calcium aluminate or calcium silicoaluminate metallurgical slags, aluminous cements of the calcium monoaluminate and calcium dialuminate types, silico-aluminous cements, calcium or barium silicates and alkaline-earth metal oxides which have been calcined beforehand, of the magnesia, dolomite, lime and barytes group, from the group consisting of 14 to 54% of a constituent made up of fine particles of a compound other than an oxide, 90% of which have a particle size of between 1 and 150 μm with a median diameter of between 3 and 20 μm, these fine particles comprising particles of a substance which has a thermal conductivity higher than approximately 30 W/mK, selected from silicon carbides, silicon carbonitrides, silicon nitrides, boron carbides, titanium carbides and tungsten carbides, and from 14 to 54% of a constituent made up of ultrafine particles at least 70% of which have a particle size smaller than 1 μm with a median diameter of between 0.3 and 0.8 μm, (2) water in a ratio water/binder lower than 0.20, with the addition of a dispersant, and (3) fillers comprising from 200 to 300 parts in weight of metal granulates for 100 parts in weight of the said alkaline-earth mineral substance and from 600–800 parts in weight of metal fibers for 200 parts in weight of the said alkaline-earth mineral substance, wherein the concrete composition has a thermal conductivity at 200° C. which is equal to or higher than 5 W/mK, allowing the concrete to set, heat treating the concrete, and recovering the said two half-moulds after cooling.

2. The process according to claim 1, wherein the fine particles have a hardness of at least 1800 kg/mm2 Knoop hardness.

3. The process according to claim 1, wherein the ultrafine particles are selected from the group consisting of microsilicate, chromium oxide, titanium oxide, zirconium oxide and aluminium oxide.

4. The process according to claim 1, wherein the metal granulates are selected from the group consisting of shot made from stainless steel, cast iron, copper or any metal or alloy which is chemically compatible with the binder, or from mixtures of these components.

5. The process according to claim 1, wherein the metal fibres are selected from the group consisting of steel or stainless steel fibres.

6. The process according to claim 1, wherein the alkaline-earth mineral substance is an aluminous cement.

7. The process according to claim 1, wherein the dispersant is selected from the group consisting of alkali metal tripolyphosphates, hexametaphosphates and polynaphthalenesulphonates.

8. The process according to claim 1, wherein the water/binder ratio is lower than 0.16.

9. Process according to claim 1, wherein after the concrete has been cast the concrete is allowed to set at a temperature of approximately 20° C. for a period of 16 to 24 hours, is stoved in an oven at a temperature ranging from room temperature to approximately 60° C., the temperature is raised to approximately 250° C. at a rate ranging from 1° to 20° C./h, the concrete is left at this temperature for a period of 6 to 18 h, is cooled to a temperature of 70° to 80° C. at a rate of 1° to 20° C./h and is removed from the oven at this temperature.

10. The process according to claim 3 wherein the ultrafine particles are microsilica.

11. The process according to claim 7 wherein the dispersant is selected from the group consisting of Na tripolyphosphate or Na hexametaphosphate.

* * * * *